Oct. 7, 1958 X. B. K. GREEN ET AL 2,855,166
FOLDING BASE STRUCTURE ADAPTABLE FOR FOOD SLICING MACHINES
Filed June 18, 1953
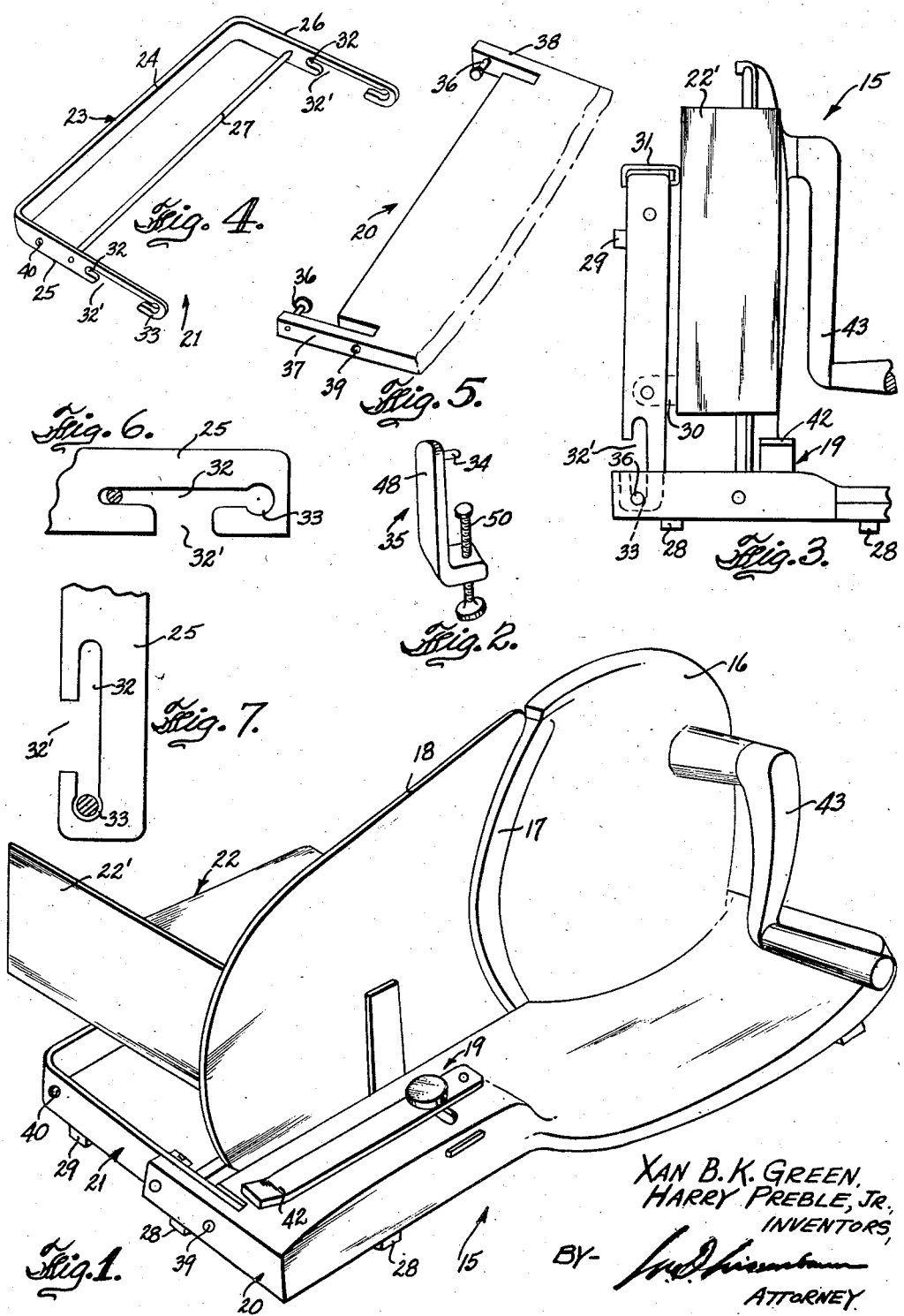

United States Patent Office 2,855,166
Patented Oct. 7, 1958

2,855,166

FOLDING BASE STRUCTURE ADAPTABLE FOR FOOD SLICING MACHINES

Xan B. K. Green, New Paltz, and Harry Preble, Jr., Cross River, N. Y., assignors to General Slicing Machine Co., Inc., Walden, N. Y., a corporation of New York Application June 18, 1953, Serial No. 362,563

1 Claim. (Cl. 248—19)

The present invention relates to a foldable base adaptable for a food slicing machine of the type including a rotary disc blade to which the food to be sliced is fed by a reciprocatable slidably mounted carriage.

An object of this invention is to provide a novel and improved foldable base structure adaptable for a food slicing machine of the class mentioned, whose construction is comparatively inexpensive and which affords itself to be folded compactly and utilizing a clamp to mount said machine securely onto a counter or table top; said clamp also serving to hold the machine assembled and non-foldable when such machine is in use.

A further object hereof is to provide novel and improved constructions in foldable base structures for slicing machines, of the kind set forth, which are efficient in carrying out the purposes for which they are designed.

Other objects and advantages will become apparent as this disclosure proceeds.

In the accompanying drawings forming part of this specification, similar characters of reference indicate corresponding parts in all the views.

Fig. 1 is a perspective view showing a food slicing machine including a base structure embodying the teachings of this invention. The machine is here shown in use condition, requiring only to be properly clamped onto a table or counter top as will be explained.

Fig. 2 is a perspective view of a clamp which may be used for such purpose. It is here, a separate part.

Fig. 3 is a front view of the machine shown in folded condition.

Fig. 4 is a perspective view of the base part which carries the food carriage thereon. It is U-shaped.

Fig. 5 is a perspective view of the cast base part which has other components of the machine mounted thereon.

Fig. 6 shows only the free end portion of each of the arms of said U-shaped base member of Fig. 4. Said base member is here presumed in use position and its association with the hinge axis is here shown when the machine is in use condition.

Fig. 7 is of the same fragmentary portion shown in Fig. 6, in its position when the machine is set in folded condition.

In the drawings, the numeral 15 indicates generally a slicing machine having a housing 16 for its rotary disc blade 17, and the gage plate 18 and its associated regulator means 19. These components are mounted on the base part denoted generally as 20. Another base part 21, adapted for detachable assembly with base part 20, serves as a track on which the food carriage 22 is slidably mounted for travel aside said gage plate 18, towards and past the cutting blade 17, and back again. Operation as a slicing machine needs no further explanation, for it is well known in the art.

The base part 21 is made of a band 23 which may be of metal, bent U-shaped to have a straight portion 24 intermediate the arms 25 and 26. Inward of the free ends of said arms, they are spanned by a rod 27 which is parallel to part 24. The base parts are provided with feet 28, 29, so that the machine stands raised on the surface it is stood on to give necessary clearance to various parts of the machine. Downwardly from the underside of the platform 22' of the food carriage 22, there is a lug 30 which engages the rod and is slidable therealong, and also the channel-piece 31 which slidably engages the band portion 24, which latter with said rod 27, serve as a track for the food carriage.

In the free terminal portions of each of the arms 25, 26 of the base part 21, is a longitudinal slot as 32 having a branch 32' whose entrance is from the under edge of said arms respectively. Each such slot and branch really make a T-shaped slot. Both such T-slots are directly opposite each other. The end of the slot 32 nearest the free end of the arm 25, is enlarged so as to permit the admission into such enlarged opening 33, of the pin 34 of a clamp of the type indicated by the numeral 35. The longitudinal slot portions 32 are each of a width to admit the shank of a screw as 36.

The base part 20, at the front and rear ends of the machine, has a finger extending towards the carriage side of the machine. The slotted terminal ends of the arms 25, 26, fit between said fingers 37, 38 and contact same respectively, but base parts 20 and 21 are separable. A screw or pin as 36, extending one from each of the fingers 37, 38, is positioned through the longitudinal slot 32 in said arms 25, 26 respectively, and can be cleared by the branch slots 32'.

When the base parts 20 and 21 are in assembly as shown in Fig. 1 so that the food carriage 22 is in proper position in relation to the plane of the cutting disc blade 17, a hole 39 which is in at least the finger 37, or in 38, for admission of the clamp's pin 34, is in registry with the hole 33. The position of the screws 36 is such that when they are at the very end of the longitudinal slots 32, meaning the ends of said slots farthest away from the free ends of the arms 25, 26, the mentioned registry of the holes 39 and 33 is attained.

In use condition as in Fig. 1, the machine 15 is securely mounted onto a table or counter top by means of two clamps 35; the pin 34 of one being set within hole 40 in base part 21 and the pin of the other positioned through the aligned holes 39 and 33; such latter clamp pin and the screw 36 in the same arm of the base part 21, serving to secure the base parts against relative movement.

Upon removal of the clamps 35, the machine 15 may be folded as shown in Fig. 3, for storage, or originally for shipment. The base parts 20 and 21 are slid in a direction away from each other until the screws 36 are at slot ends 33. Now, using said screws as pivot axes, and after the carriage 22 is moved so that its upright wall 22' is forward of the front edge of the gage plate 18, the base part 21 is swung upwardly as in Fig. 3. Said wall 22', due to proper length and position of the slots 32, is high enough, to clear the operating lever 42 of the gage plate regulator means 19. If desired, the handle 43 may be made removable so that the entire machine will make a compact package.

The base structure thus provided comprises two parts, each of which carries things respectively. In use condition, such things to be in proper relation, requires the base parts to be close to one another a predetermined distance. To attain non-use condition for compactness, one of the base parts is swung upward towards the other, but in order that the things on one base part shall be clear of the things on the other base part, the base parts need first be separated a predetermined distance before the base could be folded. The base structure herein taught properly accomplishes such requirements.

The clamp 35 comprises an L-shaped body 48 having the pin 34 which extends from one of its arms to form a C-shape therewith, meaning with 48. There is also the screw 50 threadedly engaged in the other arm of member 48 and extending therethrough spaced from and parallel to its first arm.

It is evident that the base part 21 may be detached from base part 20, because of the presence of the branch slots 32', whereupon the food carriage 22 and said part 21 may be easily cleaned.

This invention is capable of various forms and numerous applications without departing from the essential features herein disclosed. It is therefore intended and desired that the embodiment shown herein be deemed illustrative and not restrictive and that the patent shall cover all patentable novelty herein set forth; reference being had to the following claim rather than to the specific description herein to indicate the scope of this invention.

We claim:

In a base structure of the character described, first and second U-shaped base members positioned so that the arms of one are between the arms of the other; one arm of each of said base members being adjacent one arm of the other; each arm of one of said members having a longitudinal slot; the slots being in alignment, aligned pins extending one from each of the arms of the other base member into said slots respectively, and turnable therein and slidable therealong respectively whereby said base members are movable laterally apart and towards each other and swingable towards and away from each other about the axis offered by said pins; each arm of a pair of adjacent arms being provided with a hole; said holes being so positioned that they are in alignment when both said base members rest on a flat surface and said members are a predetermined distance apart, a clamp to releasably mount the base structure on a counter or table top; said clamp having a pin extending therefrom, which pin is releasably fitted in said aligned holes, holding said base members from relative movement.

References Cited in the file of this patent

UNITED STATES PATENTS

| | | |
|---|---|---|
| 1,036,367 | Sterling | Aug. 20, 1912 |
| 1,147,923 | Bond | July 27, 1915 |
| 1,273,138 | Bond | July 23, 1918 |
| 1,963,721 | Smith | June 19, 1934 |
| 2,091,632 | Friedman | Aug. 31, 1937 |
| 2,182,708 | Shlevin | Dec. 5, 1939 |
| 2,611,406 | Preble | Sept. 23, 1952 |

FOREIGN PATENTS

| | | |
|---|---|---|
| 484,596 | Germany | Oct. 19, 1929 |
| 499,181 | Germany | June 3, 1930 |